(12) United States Patent
Valyi et al.

(10) Patent No.: US 6,328,549 B1
(45) Date of Patent: Dec. 11, 2001

(54) APPARATUS FOR PREPARING A MOLDED ARTICLE

(75) Inventors: Emery I. Valyi, deceased, late of Katonah, NY (US); by Rush Holt, legal representative, Pennington, NJ (US); Arthur K. Delusky, Detroit, MI (US); Thomas M. Ellison, Fort Mill, SC (US); Herbert Rees, Orangeville (CA)

(73) Assignee: The Elizabeth and Sandor Valyi Foundation, Inc., NY (US)

( * ) Notice: Subject to any disclaimer, the term of this patent is extended or adjusted under 35 U.S.C. 154(b) by 0 days.

(21) Appl. No.: 09/525,970

(22) Filed: Mar. 15, 2000

Related U.S. Application Data

(62) Division of application No. 09/130,864, filed on Aug. 7, 1998, now Pat. No. 6,132,669.
(60) Provisional application No. 60/055,652, filed on Aug. 14, 1997.

(51) Int. Cl.$^7$ .................................................. B29C 31/06
(52) U.S. Cl. .................... 425/112; 425/258; 425/120; 425/388
(58) Field of Search .................................. 425/388, 112, 425/256, 131.1, 120, 113; 264/266

(56) References Cited

U.S. PATENT DOCUMENTS

| | | | |
|---|---|---|---|
| 5,238,640 | * | 8/1993 | Masui et al. .................. 425/112 |
| 5,401,457 | * | 3/1995 | Valyi ............................ 264/266 |
| 5,833,916 | * | 11/1998 | Takada et al. ................ 264/266 |
| 5,925,302 | * | 7/1999 | Oono et al. ................... 425/112 |
| 5,989,480 | * | 11/1999 | Yamazaki ..................... 425/112 |
| 6,045,732 | * | 4/2000 | Nakatsuji et al. ............. 264/255 |

* cited by examiner

Primary Examiner—Robert Davis
Assistant Examiner—Thu Khanh T. Nguyen
(74) Attorney, Agent, or Firm—Bachman & LaPointe, P.C.

(57) ABSTRACT

A film is placed over a mold cavity and molten plastic deposited thereon to form a combination of a film with molten plastic thereon. The film-molten plastic combination is then formed in said mold cavity into a molded article in the shape of the mold cavity.

19 Claims, 6 Drawing Sheets

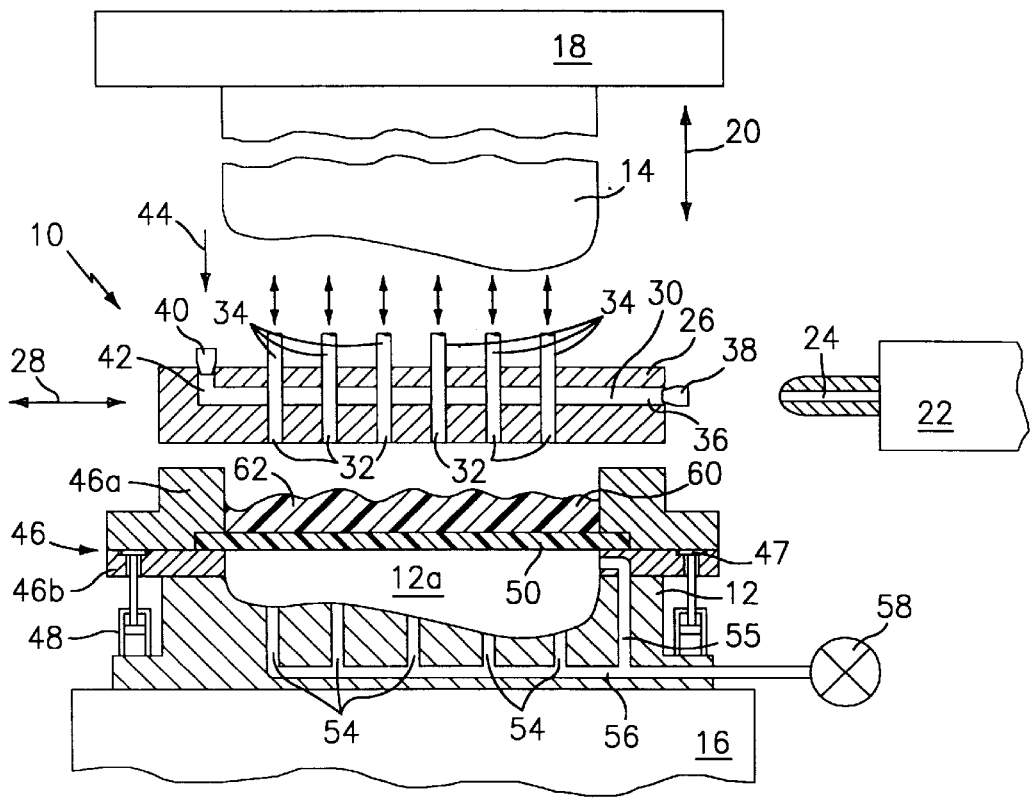
FIG. 1
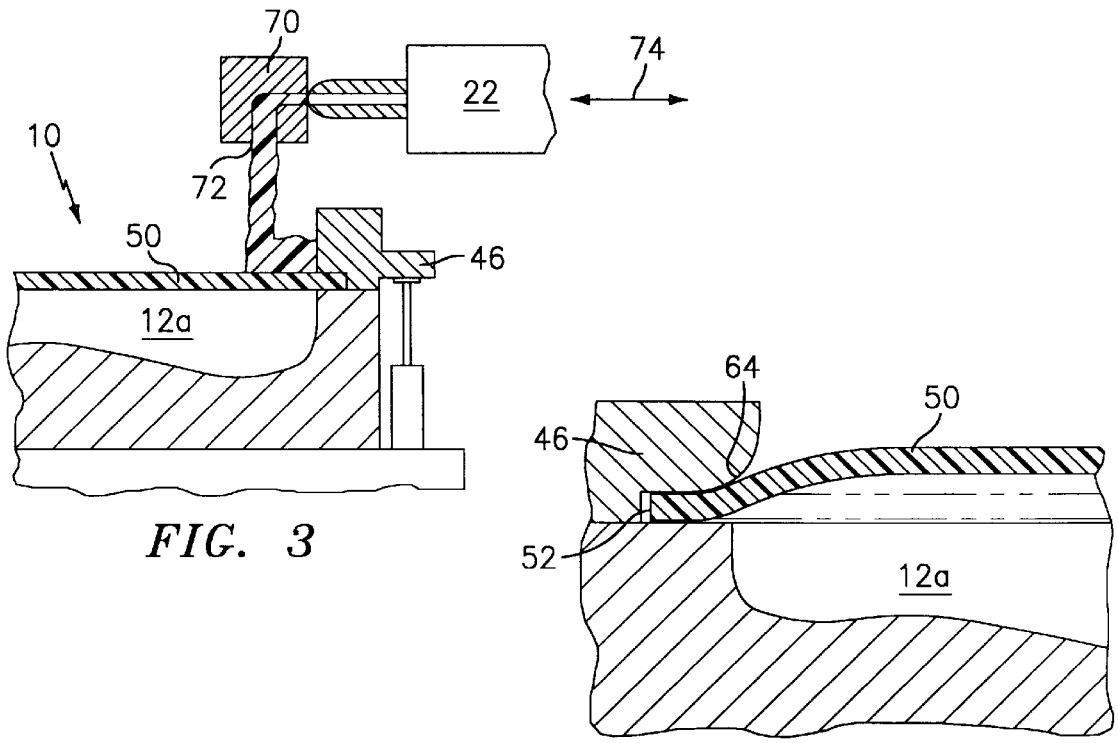
FIG. 3
FIG. 2

APPARATUS FOR PREPARING A MOLDED ARTICLE

CROSS-REFERENCE TO RELATED APPLICATION

This is a Division, of application Ser. No. 09/130,864 filed Aug. 7, 1998 now, U.S. Pat. No. 6,132,669.

This application claims the benefit of Provisional Application Ser. No. 60/055,652, filed Aug. 14, 1997 for COMPRESSION MOLDED ARTICLE THAT MAY BE COLOR COATED, By Emery I. Valyi.

BACKGROUND OF THE INVENTION

In accordance with U.S. Pat. No. 5,401,457 for PROCESS FOR FORMING A COLOR COATED ARTICLE, By Emery I. Valyi, Patented Mar. 28, 1995, a process is provided for forming a color coated article. In accordance with the '457 patent, a film is placed substantially flat over a mold cavity and deformed by a core mold half and by molten plastic entering through a sprue.

An alternate method consists of thermoforming the film to nest accurately in the mold cavity, with said operation being carried out independently of the mold. The formed film insert is then brought to the mold and placed into the cavity. This procedure is described by Ch. Fridley, Avery Dennison, in Product Finishing, Apr. 19, 1992, and European Patent 0,442,128 to Beyer, and other publications. The Avery procedure entails a forming process of the film that is well known and widely practiced for other uses. It is a low pressure process for shaping the film or sheet, in solid condition, at relatively low temperatures. This holds for all of the several variants of thermoforming, such as vacuum forming, whether the vacuum is to suck the film into the cavity, or onto the core, as well as thermoforming followed by a sizing operation.

The result of this is a product whose dimensional accuracy and shape conformance is not within the range of a high pressure forming process, such as injection molding or compression molding. Consequently, the thermoformed preform, while nesting in the mold cavity or slipped over the core, fails to conform to them fully. Thus, upon injecting or compressing plastic behind the preform, the preform will deform producing localized surface imperfections. These imperfections may be dimensionally insignificant but optically discernible and therefore may provide a product of insufficient quality for an automotive finish, for example. In addition, the cost of a separately made film insert is relatively high, considerable trim scrap is generated, and the handling (transport, destacking, insertion) become expensive.

The procedure of the '457 patent overcomes the above defects; however, it is difficult to control, particularly when molding parts with large surfaces and sharply varying curvature. The difficulties increase when the plastic is pressure molded at high enough temperatures to reduce the film strength substantially, as in the case of conventional injection molding.

In applying either of the above processes to large, panel-like structures, it was found, moreover, that the procedure of injection molding of the '457 patent and Avery Dennison procedure referred to above, is difficult to carry out, requiring extremely costly equipment, and prone to produce imperfections at the interface between the film layer and the injected plastic.

Accordingly, it is a principal object of the present invention to provide a process and apparatus which conveniently and expeditiously forms a molded article from molten plastic and a film insert, wherein the film is the outer layer of the molded article and wherein desirably the film is colored.

It is a further object of the present invention to provide a process and apparatus as aforesaid which overcomes the foregoing defects and provides a commercially feasible process and apparatus for forming a color coated article.

It is a still further object of the present invention to provide a process and apparatus as aforesaid which is operative under conditions that are sufficiently controllable and cost efficient to produce complex parts, particularly those of a size of major body components of passenger cars.

Further objects and advantages of the present invention will appear hereinbelow.

SUMMARY OF THE INVENTION

In accordance with the present invention, the foregoing objects and advantages are readily obtained.

The present invention includes a process for preparing a molded article, which comprises: providing a mold cavity; placing a film or blank over the mold cavity; depositing molten plastic on said film to form a combination of a film with molten plastic thereon; and subsequently forming said film-molten plastic combination in said mold cavity into a molded article having the shape of said mold cavity, wherein the film is an outer layer of the molded article. Desirably, the film is colored and is held over the mold cavity and molten plastic is deposited onto the film. Also, preferably the combination is formed into the shape of the mold cavity at least in part by a mold core which compresses the combination and forms the combination into the shape of the mold cavity. Thus, the resultant article is desirably a molded, color coated article having a desired shape, which may be a complex shape, as defined by the shape of mold cavity. Naturally, the mold may include other components, such as slides and lifters which are well known.

The present invention also includes an apparatus for preparing a molded plastic article, which comprises: a mold cavity; means for holding a film or blank, desirably a colored film, over the mold cavity; means for depositing molten plastic onto said film to form a combination of a film with molten plastic thereon; and means for forming said film-molten plastic combination subsequent to depositing molten plastic onto said film in said mold cavity into a molded article having the shape of the mold cavity, wherein the film is an outer layer of the molded article.

The present invention adheres to the principle of forming the film in uniformity with the plastic that backs same, and thereby to effect full shape conformance without optically discernable flaws of the exposed film surface, which may be a paint film, and to form the resultant molded article under closely controlled conditions of temperature distribution and pressure in an efficient manner.

Further specific features and advantages of the present invention will appear hereinbelow.

BRIEF DESCRIPTION OF THE DRAWINGS

The present invention will be more readily understood from a consideration of the following drawings wherein:

FIG. 1 is a partly schematic view of the apparatus and process of the present invention in an early stage of the preparation of the molded article;

FIGS. 2 and 3 are partial views showing variations in the process and apparatus of the present invention;

DETAILED DESCRIPTION OF PREFERRED EMBODIMENTS

Figure 4:
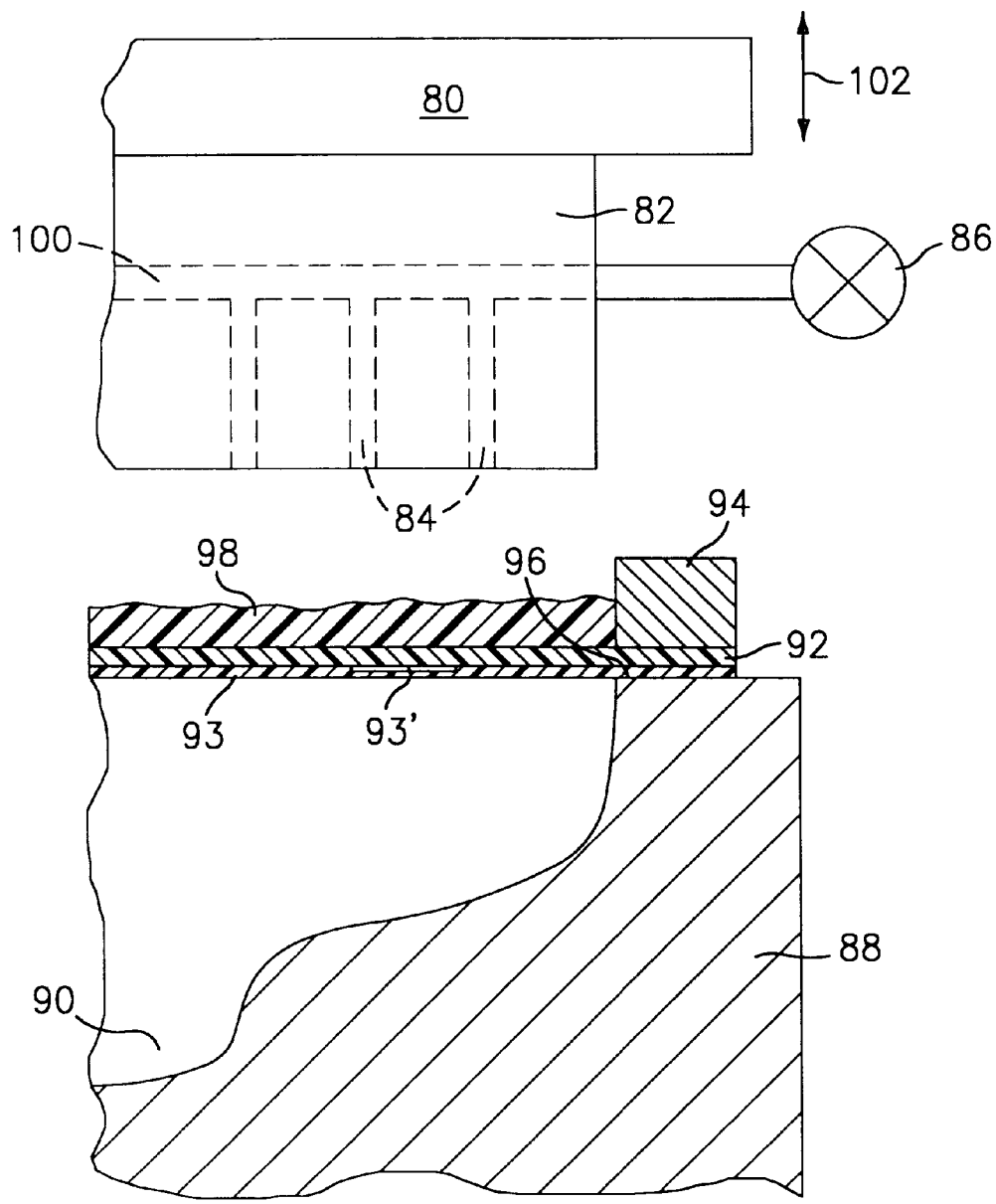
FIG. 4 is a partial view further variation of the process and apparatus of the present invention.

Referring to FIGS. 1–3, a mold 10 consisting of cavity half 12 having a mold cavity 12a therein and core half 14 is mounted on respective platens 16 and 18. Mold cavity 12a has a shape of the desired final molded article. At least one of cavity half and core half is reciprocable in the direction of the arrow 20 from an open to a closed position and from a closed to open position via motive means (not shown). An extruder/injection unit 22 having a nozzle 24 is arranged adjacent mold 10 to coact and couple with a hot plastic delivery means, as plate 26. Plate 26 is relatively reciprocable in the direction of the horizontal arrow 28 from a position adjacent mold cavity 12a to a position spaced from mold cavity 12a and is supplied with hot, flowable plastic by extruder 22 and nozzle 24.

Depending on the nature of plate 26, the extruder may be stationary or reciprocable with plate 26. Naturally, other variations in the hot plastic delivery system may be used. For example, the extruder/injection system and hot plastic delivery means may be stationary externally to the press and the mold traversed reciprocably relative to the extruder/injection system. Other variations may be readily contemplated.

Plate 26 in FIG. 1 is a hot runner having an elongated channel 30 which communicates with a multiplicity of openings 32 positioned over mold cavity 12a. Each opening is closeable by known means, as by valve means 34. The openings 32 receive hot plastic under pressure from extruder 22 through extruder nozzle 24 and hot runner feed channel 30. While the extruder 22 and hot runner delivery plate 26 are coupled, plastic is caused to flow from nozzle 24 into channel 30. For the delivery plate to operate when the extruder is detached, a free end 36 of channel 30 contains a check valve 38 (shown schematically), and pressurized piston means 40 are added to engage the opposed end 42 of channel 30 to operate by conventional means, for example, a hydraulic cylinder (not shown) to apply force to hot runner channel 30 in the direction of the vertical arrow 44.

Alternatively, one could selectively close valve means 34 and apply pressure through piston means 40, thereby obtaining a thicker coating in desired locations. Alternatively, one could use shooting pots or plastic reservoirs, for example, connected to each individual valve means, thereby obtaining additional resin thickness where desired.

In one method of operation, the extruder 22 is left in place spaced from mold 10 and the plate 26 alone is moved into position over mold cavity 12a as shown in FIG. 1, after having been charged with hot plastic by extruder 22. To prevent drooling, check valve 38 is closed. In addition, piston means 40 may be retracted in engagement with channel end 42, thereby creating suction in channel end 42 to better retain the hot plastic therein.

A hold down and spacer frame 46 is aligned with cavity half 12, engageable therewith and detachable therefrom and coupled with means to move same (not shown) towards and away from cavity half 12 independently of the reciprocal movement of core half 14. Thus, a pair of lift cylinders 48 may be mounted on either platens 16 or 18 with mounting on platen 16 being shown in FIG. 1.

Thus, plate 26 is filled with hot plastic by extruder 22. If the two are coupled, they are moved so as to place the hot runner into alignment with cavity half 12. Before so placing the hot runner, spacer frame 46 is lifted away from cavity half 12 far enough to permit a precut film or blank 50 to be placed over the rim 52 (see FIG. 2) of the mold cavity 12a of cavity half 12 by any desired means, as for example, shown in the '457 patent. With the blank 50 in place, frame 46 is moved towards cavity half 12 to hermetically clamp blank 50 over the mold cavity 12a as shown in FIG. 2, thereby rendering said cavity capable of retaining elevated fluid pressure. Optionally, the film may be offset from the cavity and supported by air jets. Alternatively, spacer frame 46 may include an upper half 46a and a lower half 46b with a space 47 therebetween as shown in FIG. 1. This clamp may be a slip clamp to permit release of the film into mold cavity 12a during forming and thereby minimize edge scrap and reduce the amount of film thinning that may occur. If desired, scrap trim may be minimized by folding over excess film and heat sealing the excess film to inside edge portions of the molded article, as by ironing.

Fluid pressure may then be applied to mold cavity 12a under blank 50, as through channels 54 connected through a joint manifold 56 with pressure control means 58. The fluid usually used is air, but may also be an inert gas if the material of blank 50 so requires. Alternatively, fluid pressure may be applied through channel 55 in cavity half 12 directly beneath film blank or film 50 in order to properly hold the film in place. Preferably, a plurality of locations, or a continuous channel, are provided around the circumference of the film directly beneath the film. Also, these may be valved separately from channels 54 or used instead of channels 54.

Nozzle valve means 34 are then withdrawn to allow hot plastic to flow freely from hot runner plate 26 through nozzle openings 32 onto blank 50 in the space between the hot runner plate 26 and blank 50 and within frame 46. The space within frame 46 is not filled under substantial pressure, such as usual in injection molding. Rather, only an accurately metered amount 60 of hot plastic is deposited upon blank 50 from hot runner plate 26, namely that which corresponds substantially to the molding cavity to be formed in mold cavity 12a by cavity half 10 and core half 14 in the closed condition.

It is important to note that in consequence of introducing the hot plastic into the space within frame 46, no more pressure is applied underneath the blank via fluid channels 54 and 55 than that sufficient to support the metered amount 60 of plastic being so deposited. Desirably, the air pressure is variable depending on product requirements. Indeed, vacuum may be used during forming. As schematically indicated in FIG. 1, that metered amount 60 will comprise a plastic layer that will conform to the flat surface of the blank on one side, while its opposite surface will have an uneven surface 62 as clearly shown in FIG. 1, showing traces of the viscous flow pattern that will have emerged from nozzles 32. Naturally, the nozzles are spaced closely enough to permit the emerging plastic to form a continuous, homogeneous layer. Alternatively, one polymer could be deposited in a designed pattern, and a second or a plurality of second polymers deposited in a designed pattern. This could be done with one or more extruders feeding for example separate channels to deposit a predesigned pattern of multiple resins. As a further alternative, one could sequentially feed polymers of different characteristics to provide designed properties in the finished product.

Each of nozzles 32 may be independently temperature controlled, if desired, and hence capable of depositing the plastic in a pattern of predetermined temperature distribution.

Before releasing the hot plastic into the space above blank 50, the mold cavity 12a is pressurized as described above, as by air pressure entering through channels 54. Since the finished product is usually thin, while having a large surface area, the weight of metered plastic 60 is relatively low and the average static pressure it exerts upon the film or blank 50 is low as well. Hence, relatively low pressure in the mold cavity will suffice to keep the blank 50 from sagging under the weight of the metered plastic, even when blank 50 is heated by contact with the metered plastic. For example, a metered amount of plastic measuring 2'×4'×0.5", made of plastic weighing 0.05 pounds per cubic inch, will exert a pressure of 0.025 psi over the said area. This amounts to very slight over pressure to support the blank, with the result that said blank will not bulge (balloon) upward excessively when pressure is first applied under it. In exceptional instances, the layer of hot plastic being applied over the blank may be of much greater depth. Even then, the above indicated pressure would not cause excessive bulging. Forming of a crease-like line at the edge of spacer frame 46, may be prevented as shown by a curved clamping surface 64 thereof in FIG. 2 with slight upward bulging of film 50 shown caused by pressurization of mold cavity 12a. Indeed, upward bulging may be desirable in some instances, as for feed draw parts.

After deposition of the plastic layer 60 on film 50, plate 26 is moved from between cavity half 12 and core half 14 and mold 10 is closed, as by moving core half 14 into mold cavity 12a. This results in forming the film and deposited plastic into a composite laminate in the shape of the closed mold cavity in an expeditious and convenient manner.

The blank is preferably plastic, and any desired plastic material may be used for the blank or molten plastic material, for example, polyolefins, polyvinyl chloride, polystyrene, polycarbonates, etc. Any thermoplastic and/or thermoset material may be used for the molten material, such as for example, structural foam, rim, epoxy, polyurethanes, bulk molding compound, sheet molding compound, etc. The blank may be cut or stamped from a web and a supply of blanks having the size and shape to fit over mold cavity 12a maintained adjacent mold 10 for transfer to the mold as described above. The depth of color on the blank may naturally be varied depending on needs. One should naturally consider the thinning of the blank or film during processing and adjust the color depth to the amount of deformation any given portion of the blank or film is to undergo. Thus, for example, thicker paint coatings may be applied to selective blank or film locations that are to obtain greater deformation during processing in order to obtain uniformity of color in the final molded product. The blank or film may, for example, be intaglio-embossed. The blank may be applied to the mold with robot means or removably adhered to a carrier film strip. The carrier film strip may be provided with means to register the position of the blanks relative to the mold half onto which the blanks are to be placed, e.g., edge perforations. The carrier, with the blanks attached, may then be supplied from a roll. Once the blank and mold are juxtaposed, suction is applied to the edge of the blank by the mold, as through channels, sufficient to separate the blank from the carrier strip. Naturally, other transfer means may readily be used.

FIG. 3 shows an alternate method for applying the hot plastic. Instead of plate 26 being a hot runner as shown in FIG. 1, the extruder 22 is coupled with a so-called coat hanger die 70, serving as a hot plastic delivery plate, i.e., die with a slit opening 72 for the plastic as normally used for the extrusion of wide sheets. The extruder 22 and die 70 are reciprocable in the direction of arrow 74 towards and away from mold 10. In operation, the blank 50 having been placed over the mold cavity 12a and clamped down as by spacer frame 46, as in FIGS. 1–2, the extruder 22 and die 70 are traversed over blank 50, and the desired layer of hot plastic is deposited thereover. The thickness of the plastic layer is given by the speed of traverse, the output of the extruder and the dimensions of the die, all controlled in a conventional manner. At the end of the traverse, the extruder is shut off and returned to its starting position. One may provide an extruder with width and/or thickness control to control the thickness and/or width of the plastic layer. The speed of traverse and/or the output of the extruder could be variable. The positioning of the extruder in the X, Y and Z planes could be variable to vary the dimensions and/or configuration of the plastic layer.

The advantage of this procedure is in its lower tooling cost. However, it may only be used when progressive deposition, as against simultaneous, with a hot runner, is acceptable, e.g., for narrow parts requiring but a relatively short traverse of the extruder.

A significant feature of the present invention is the uniformity of heating of the film or blank without having to resort to external means, and the assurance that the forming operation is carried out simultaneously, film or blank and the backing layer, followed by the application of high enough molding pressures to provide mold conformance of both. The finish of the film is thereby preserved and optically detectable imperfections are avoided. Also, this procedure requires much lower clamping pressure than conventional procedures.

While the foregoing procedure is aimed primarily at application in the exterior of vehicles, it should be noted that there are many other types of components that would benefit from the subject process of compression molding with a colored finish and with an accurately molded article, particularly for large household appliances and architectural components.

Referring to the variation of FIG. 4, platen 80 is shown with an elastomeric forming mandrel 82 therein containing air slots 84 and pressure control means 86 connected thereto. Mold 88 is shown with mold cavity 90 therein, film 92 and clamping frame 94 to hold the film on the mold rim 96. The hot plastic 98 is deposited on film 92 as in previous embodiments. As shown in the embodiment of FIG. 4, slots 84 intersect a manifold slot 100 which is connected to a source of fluid pressure, as air.

In operation, the elastomeric mandrel 82 enters the clamping frame 94. Pressure air is applied to slots 84 expanding the slots into passages. Thereby, pressure is applied to the deposited plastic 98 and the film 92. Pressure is present in the mold cavity 90 as in FIGS. 1–3 and the pressure is controllably released at the same time, resulting in blow molding of plastic 98 and film 92. The mandrel 82 moves simultaneously downward in the direction of arrow 102. As the plastic and film reach the mold surface, the mandrel continues and due to its elastic nature conforms to the surface of the plastic away from the film, and continuing pressure by the platen exerts hydrostatic pressure on the plastic. That pressure may be much higher than would be economically available from a compressed fluid, e.g., over 1000 psi. The top or inner surface of the finished part will be substantially parallel to the mold surface. The mandrel is preferably cooled, as is the mold.

The foregoing process represents an improved method and apparatus for forming large, panel-like, thick parts because it overcomes the difficulty of heating a thick plate uniformly. It is useful, whether a colored or painted film is required or not. Any plastic film may be used as a support of the hot plastic so long as it is compatible with the plastic to be molded. The compatibility may be achieved by a variety of methods, such as melt bonding, use of adhesives or tie layers. Alternatively, in some cases one could use a non-compatible or removable film layer.

Alternatively, one may employ a second film layer 93 (see FIG. 4) under the main film layer 92 to provide further support for the main film layer 92. For example, a second film layer may be secured over the mold cavity to support a thinner, fragile film or multiple films in position, or to support a logo or decal 93' on film 92. Naturally, the second film may desirably be transparent, and naturally also the second film may be used with any embodiments of the present invention. The second film will desirably be secured to the mold in the same manner as the main film.

Figure 5:
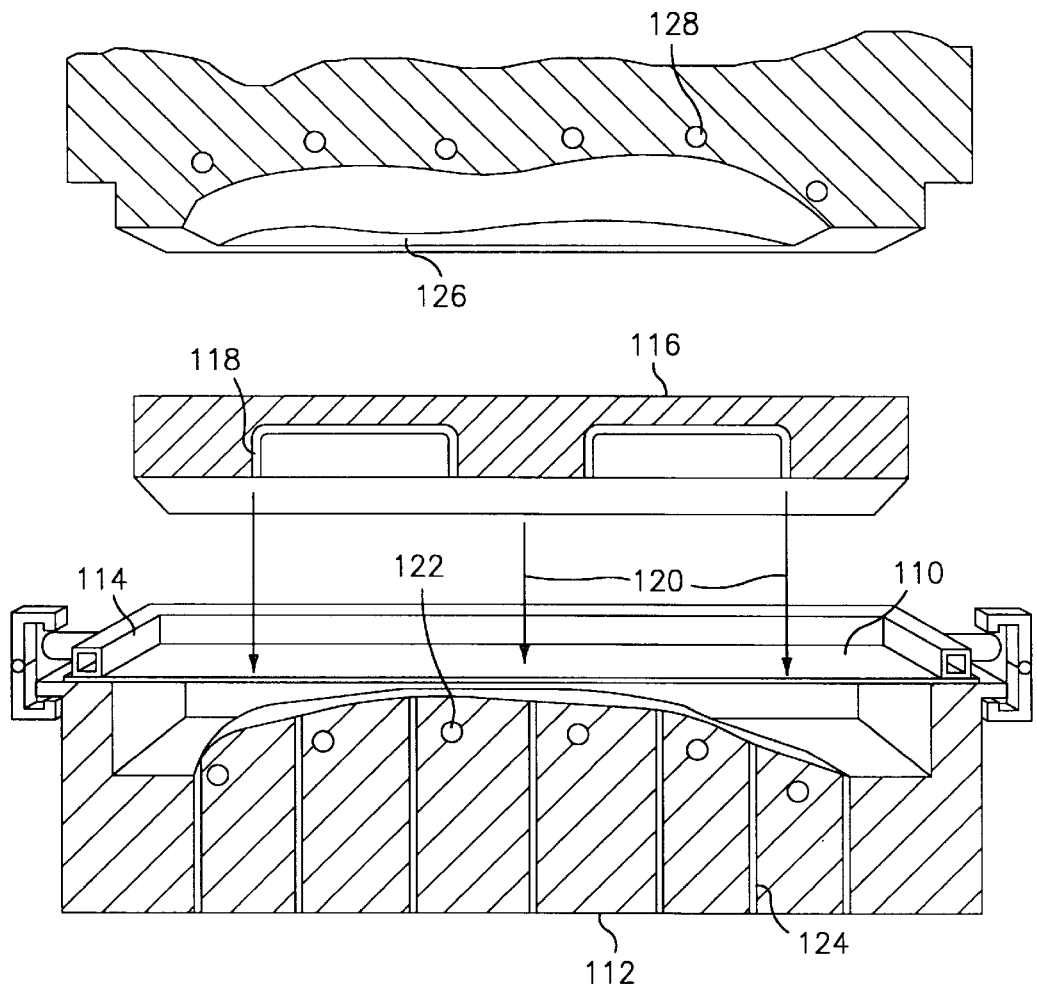
FIGS. 5, 6, 7 and 8 show additional variations of the present invention.
Figure 6:
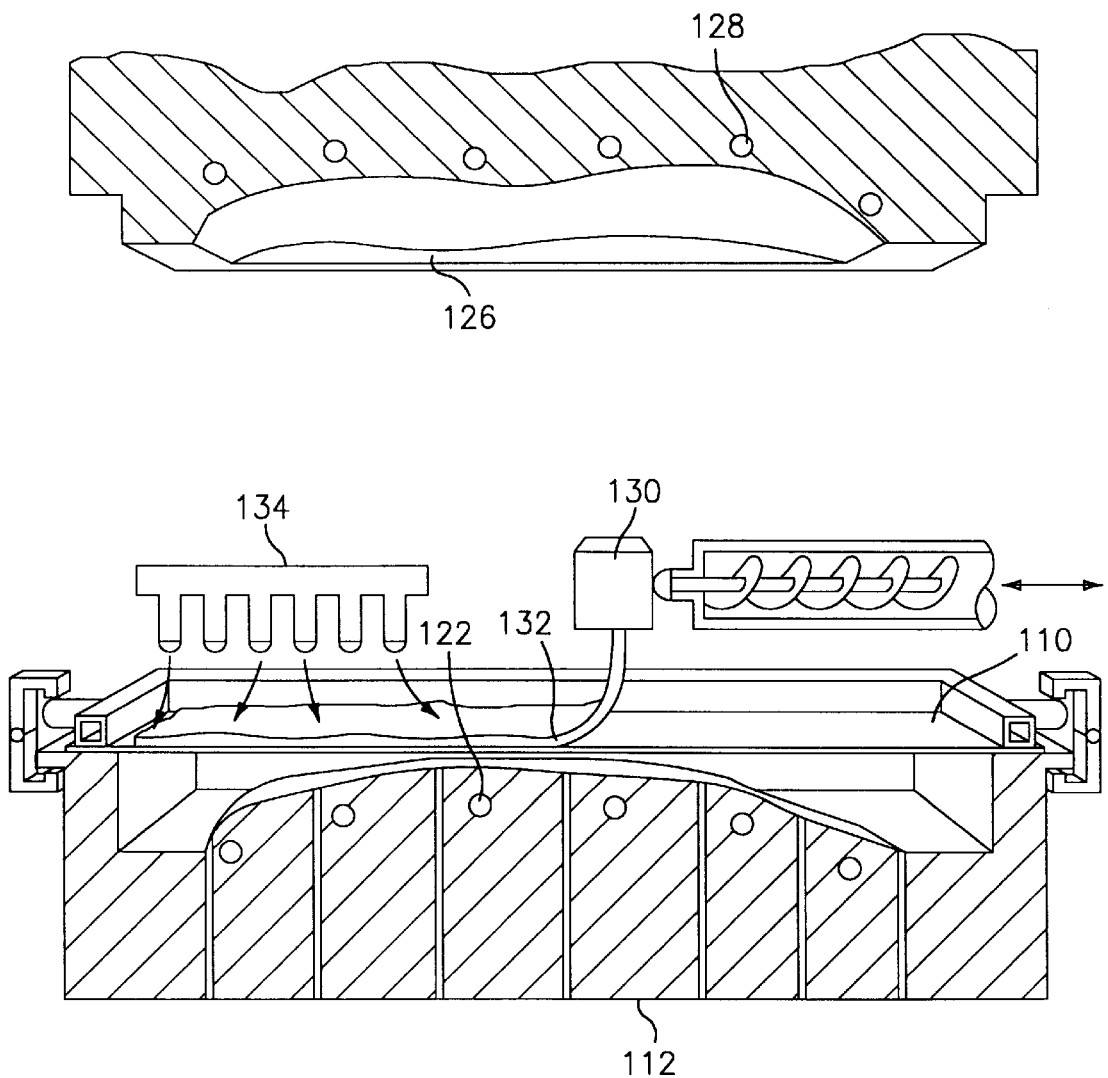
Figure 7:
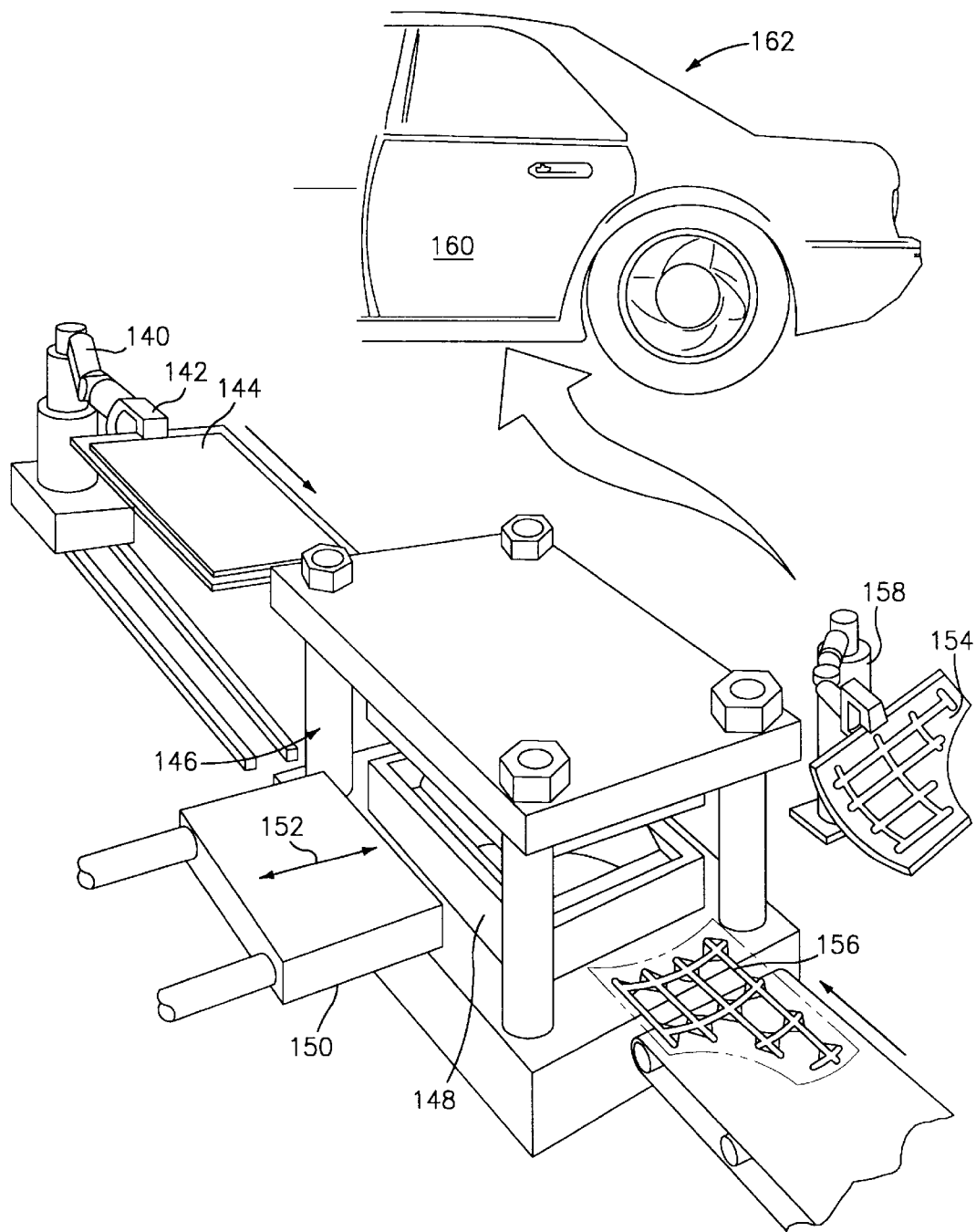

FIGS. 5, 6 and 7 show detailed variations of the present invention.

As shown in FIG. 5, film 110 is held over mold cavity half 112 by frame 114 and molten plastic deposited thereon by manifold 116 via outlets 118 in the direction of arrows 120. Mold cavity half 112 includes cooling channels 122 and compressed air or vacuum channels 124 to provide air pressure under film 110 or to aid in the forming procedure. The temperature of the film sheet is adjusted according to the extent of deformation it is to undergo. The film-molten plastic combination is compression molded in the mold cavity half after removal of manifold 116 from between the mold halves via core half 126 which contains cooling channels 128. The finished molded article including the film and deposited plastic is then formed between the mold cavity and mold core.

FIG. 6 is similar to FIG. 5, with the use of traversing extruder 130 which extrudes a molten plastic layer 132 onto film 110. Air cooling nozzles 134 may be provided to properly temperature condition the molten plastic layer 132. Both the extruder 130 and cooling nozzles 134 are movable from a position above film 110 as shown in FIG. 6 to a position spaced from film 110 to permit engagement of core half 126 with the film-molten plastic combination.

FIG. 7 shows film inserter 140 and film feed means 142 for feeding a film 144 to mold 146 above mold cavity half 148. Reciprocable hot plastic delivery means 150 movable in the direction of arrow 152 is provided adjacent mold 146 to prepare a molded product 154 as in previous embodiments. In the embodiment of FIG. 7, a metal or plastic insert 156 may be fed to the mold to be made a part of molded product 154 as shown. Alternatively, a fiberglass mat or scrim may be used as a reinforcement, or any suitable and desired reinforcing or functional material, as random fiberglass material, textiles, metal, plastic, etc. One may reinforce the entire structure or selectively stiffen the structure as required. Product removal robot 158 is provided adjacent mold 146 to remove the molded product. The molded product, of course, may have a variety of uses, as for example, a side panel 160 for an automobile 162.

Figure 8:
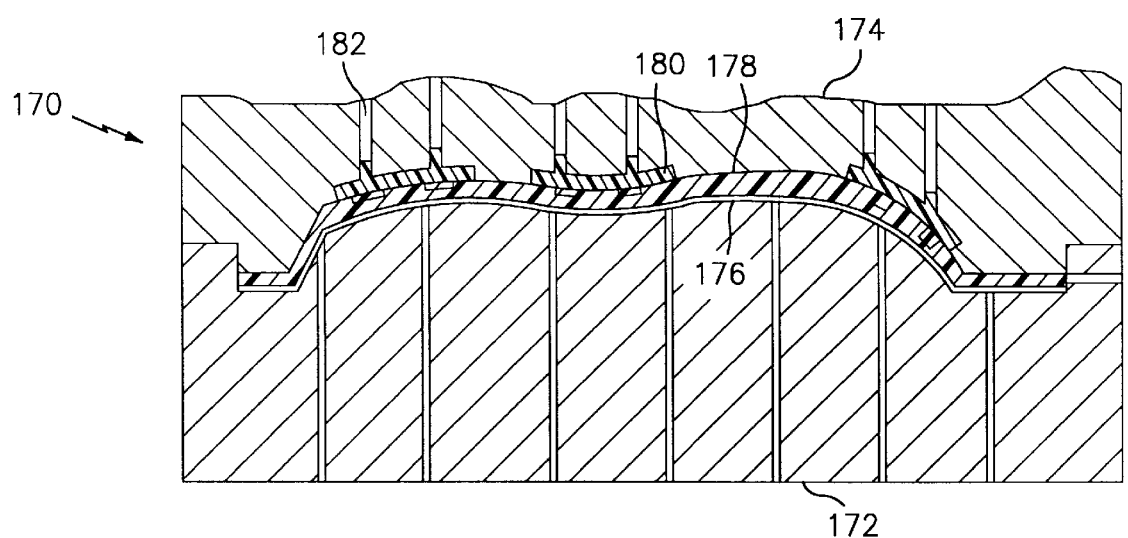

FIG. 8 shows a closed mold 170 with cavity portion 172 and core portion 174. The molded article includes film layer 176, plastic layer 178 and reinforcement material or fasteners 180. The reinforcement material or fasteners 180 may be applied to core portion 174 in order to provide exact location on the molded article. When the mold 170 is closed, the fastener or the like may be ejected via ejection passage 182 or any other desired means to become firmly bonded to or embedded in the plastic layer. Ejection may for example be by hydraulic or mechanical means. The reinforcements or fasteners may be selectively placed on the molded article as shown in FIG. 8, or may completely cover the molded article.

Alternatively, the assembly of the frame, film, plastic layer assembly may be prepared at an upstream location spaced from the mold, for example, on a removable board. All pre-conditioning operations can then be done before the assembly is deposited on the mold and the only step performed by the mold is the final forming operation. This will result in an assembly line type operation with the assembled and pre-conditioned film-plastic held on a frame transferred to the mold for final forming.

As a further alternative, one can use co-extrusion for the molten plastic. Plastic from a die may be extruded in co-layers or in multiple passes from two heads to deposit different polymers and/or compositions and/or fillers.

As a still further alternative, one may employ a variety of types of films, as a conductive film (EMI-RFI), a film with UV and/or infrared absorption characteristics, or any desired and convenient film with desired range of properties to achieve particular results.

Thus, in accordance with the present invention, a die cut film blank is placed over the mold cavity. It is cut to match the cavity edge with just enough overlap to permit clamping. The structural plastic is applied over the blank while the cavity under it is pressurized enough to support the weight of the plastic. It is dispensed either from a hot runner or a modified hot runner or from a traversing extruder. It is then conditioned as by cooling nozzles to acquire a point-by-point preset temperature distribution, including the film or blank. The mold is closed by a mold core, while the pressure in the cavity is released and the cavity is evacuated. The molded article may be provided with inserted elements of a structure made of metal or different plastics including for example scrim, fibers, woven and non-woven mats, etc. The core compresses the plastic which is coated on the core side of the film. If a paint film is used, the part can obtain a Class A finish, as molded. Because of the controlled deformation parameters or depth of color, the deformed film thickness can maintain uniform gloss and depth of color after molding. To finish the process, the part is cooled in the mold, which is temperature controlled. No mechanical ejectors are needed and no ejector marks are left: upon opening the mold, the part is separated from the mold surface by any desired means, as by air-ejectors, using the channels that were used at the outset to "float" the carrier film, and transferred by suction to the robot end of arm.

Unlike injection molding, this procedure is based on the following considerations. In the injection molding process, molten plastic is forced through a small orifice into a large space confined by walls that are intensively chilled. Mold filling occurs by coating the mold walls and filling the diminishing space between them progressively, under conditions of laminar flow. This phenomenon, called tunnel-flow, makes coinjection possible. The molten and then gradually solidifying plastic cools inward from the mold wall, through the first coat and the adjoining laminar structure, in a material that is a poor heat conductor. The rate and amount of shrinkage from melt to solid varies accordingly layer-by-layer, and depends on the changes in wall thickness spot-by-spot. Passing through the melt-transition temperature, $T_M$, particularly in crystalline plastics, interferes severely with the conformance of the plastic to the mold. Hence, the sink-marks opposite the gate vestige and at the opposite of a thick rib, and waviness of larger surfaces. Another fatal consequence of volume change at $T_M$ in large, thin injection molded panels of varying curvature, can be the residual stresses that warp surfaces as they are relieved, e.g., by environment exposure, as temperature rises, or corrosive moisture is absorbed; this, in addition to other expected consequence of stress concentrations.

The solution of this nearly intractable problem is to bypass the $T_M$—caused volume change in the molding process. This is precisely what the compression molding of the present invention accomplishes.

As an alternative embodiment, one may provide a plastic film, covered with molten plastic as above, covered in turn with a reinforcement material. The male mold would press the components together and embed the reinforcement material in the plastic. Alternatively, one may provide an additional layer of molten plastic material over the reinforcement material, effectively embedding the reinforcement material between the two plastic layers.

The present invention achieves significant advantages over injection molding procedures. Thus, the present invention results in lower equipment and tooling investments. Additionally, the use of paint films to produce finished structural panels eliminates the need for costly paint plant investments, and eliminates all the environmental issues related to painting since the film can be made in a closed, environmentally secure chamber.

In addition, no preforming of the film is required to produce Class A structural components. Cycle times are faster than injection molding. Forming pressures are lower than conventional injection molding. Further, the open mold nature of the subject process and apparatus permits selective insertion of reinforcements or additional components, such as fasteners, logos, indicias, designs, or the like.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for preparing a molded article, which comprises:

an open mold cavity having a mold surface defining a mold cavity shape;

means for holding a film over said mold cavity and supporting said film in a position spaced from said mold surface;

molten plastic delivery means above said film for depositing a metered amount of molten plastic onto said supported film, said molten plastic delivery means depositing molten plastic in a plurality of delivery locations along a facing surface of said film to form a combination of said film with molten plastic thereon; and means for forming said combination of said film with molten plastic thereon, subsequent to depositing molten plastic onto said film, in said mold cavity against said mold surface to form a molded article having said mold cavity shape, wherein the film is an outer layer of the molded article.

2. Apparatus according to claim 1, wherein said means for holding is a holding frame, and wherein said molten plastic delivery means for depositing deposits molten plastic onto said film while said film is held in said frame over said mold cavity.

3. Apparatus according to claim 2, including a mold core which at least in part forms said combination of said film with molten plastic thereon into the mold cavity shape by compressing said film-molten plastic combination and forming said combination into the shape of said mold cavity.

4. Apparatus according to claim 1, wherein said film is colored.

5. Apparatus according to claim 2, including a hot plastic delivery means positioned adjacent said mold cavity for depositing molten plastic onto said film.

6. Apparatus according to claim 5, including a hot runner with a plurality of molten plastic outlets positioned adjacent said film for depositing molten plastic onto said film.

7. Apparatus according to claim 5, including a molten plastic delivery means for depositing molten plastic onto said film by traversing said film.

8. Apparatus according to claim 6, including means for applying fluid pressure to said combination to at least in part form said molded article.

9. Apparatus according to claim 5, including a mandrel for at least in part forming said combination into said molded article.

10. Apparatus according to claim 1, including means for including an insert of a dissimilar material bonded to said molded article.

11. Apparatus according to claim 1, including means for depositing differential thicknesses of molten plastic on said film.

12. Apparatus according to claim 1, including means for including a second, supporting film on said film between said film and the mold cavity.

13. Apparatus according to claim 1, including a frame member with a channel therein operative to hold the film over the mold cavity in the channel.

14. Apparatus according to claim 1, including a frame member operative to hold the film over the mold cavity, and channel means for providing at least one of suction and air flow directly beneath said film through said frame member.

15. Apparatus according to claim 1, wherein said means for holding a film over said cavity includes means for providing air pressure under said film.

16. Apparatus according to claim 15, wherein said means for providing air pressure under said film is operative to provide variable air pressure.

17. Apparatus according to claim 1, wherein the means for depositing is a means for extruding.

18. Apparatus according to claim 1, wherein the means for depositing is a means for co-extruding.

19. Apparatus according to claim 1, including means for depositing multiple plastic materials on said film.

* * * * *